US009810194B2

(12) United States Patent
Nozawa

(10) Patent No.: US 9,810,194 B2
(45) Date of Patent: Nov. 7, 2017

(54) FIRST IMPROVEMENT OF WAVE ACTIVATED POWER GENERATION SYSTEM WITH THE RACK AND PINION MECHANISM

(71) Applicant: Tsukasa Nozawa, Tokyo (JP)

(72) Inventor: Tsukasa Nozawa, Tokyo (JP)

(*) Notice: Subject to any disclaimer, the term of this patent is extended or adjusted under 35 U.S.C. 154(b) by 90 days.

(21) Appl. No.: 14/909,151

(22) PCT Filed: Dec. 21, 2013

(86) PCT No.: PCT/IB2013/002851
§ 371 (c)(1),
(2) Date: Feb. 1, 2016

(87) PCT Pub. No.: WO2015/015245
PCT Pub. Date: Feb. 5, 2015

(65) Prior Publication Data
US 2016/0177910 A1  Jun. 23, 2016

(30) Foreign Application Priority Data

Aug. 1, 2013 (WO) .................. PCT/IB2013/001693

(51) Int. Cl.
*F03B 13/18* (2006.01)
*F03B 13/10* (2006.01)
(Continued)

(52) U.S. Cl.
CPC .............. *F03B 13/10* (2013.01); *F03B 11/02* (2013.01); *F03B 13/16* (2013.01); *F03B 13/186* (2013.01);
(Continued)

(58) Field of Classification Search
CPC ....... F03B 13/22; F05B 2240/95; Y02E 10/38
(Continued)

(56) References Cited

U.S. PATENT DOCUMENTS

2011/0084488 A1* 4/2011 Eder .................... F03B 13/186
290/53
2012/0139261 A1* 6/2012 Dick ...................... F03B 13/20
290/1 C
(Continued)

FOREIGN PATENT DOCUMENTS

DE  10 2009 039214 A1  3/2011
DE  10 2010 013199 A1  9/2011
(Continued)

OTHER PUBLICATIONS

International Search Report and Written Opinion in corresponding PCT application PCT/IB2013/002851 dated Jun. 5, 2014, 12 pp. in English.

*Primary Examiner* — Jorge Leon, Jr.
(74) *Attorney, Agent, or Firm* — Juan Carlos A Marquez; Marquez IP Law Office, PLLC

(57) ABSTRACT

The present invention is directed to a wave activated power generating device that incorporates a support frame; a buoy vertically positioned to rise and fall relative to motion of waves impacting the buoy and the support frame, the buoy being formed with a hollow interior space; a rack and pinion structure operatively connected between the buoy and the support frame such that a pinion element of the rack and pinion structure generates rotating torque by moving along the rack element in response to the buoy rising and falling by the wave motion; and a power generator unit operative connected to the rack and pinion structure to generate electricity in response to rotating torque generated by the pinion element. The rack structure is fixedly connected to at least one vertical surface inside the hollow interior space of the buoy. The pinion element is fixedly mounted on the support frame to extend into the hollow interior space of the
(Continued)

buoy and operatively positioned to movably interconnect with the rack structure as the buoy rises and falls.

6 Claims, 11 Drawing Sheets

(51) Int. Cl.
  *F03B 11/02* (2006.01)
  *F03B 13/16* (2006.01)
  *F03B 13/22* (2006.01)
(52) U.S. Cl.
  CPC ........... *F03B 13/22* (2013.01); *F05B 2240/95* (2013.01); *F05B 2260/30* (2013.01); *Y02E 10/38* (2013.01)
(58) Field of Classification Search
  USPC ........................................ 60/497; 290/42, 53
  See application file for complete search history.

(56) References Cited

U.S. PATENT DOCUMENTS

| | | | | |
|---|---|---|---|---|
| 2012/0247098 | A1* | 10/2012 | Stewart | F03B 11/00 60/501 |
| 2013/0229011 | A1* | 9/2013 | Kawaguchi | F03B 13/1815 290/42 |
| 2014/0035286 | A1* | 2/2014 | Nozawa | F03B 13/186 290/53 |
| 2014/0159380 | A1* | 6/2014 | Schlemmer | F03B 13/00 290/1 R |

FOREIGN PATENT DOCUMENTS

| | | | |
|---|---|---|---|
| IN | WO 03098033 A1 * | 11/2003 | ............ F03B 13/186 |
| JP | 2007-297929 A | 11/2007 | |
| NL | 1016103 C1 | 3/2002 | |
| NO | 2007/130331 A2 | 11/2007 | |

* cited by examiner

FIRST IMPROVEMENT OF WAVE ACTIVATED POWER GENERATION SYSTEM WITH THE RACK AND PINION MECHANISM

CROSS-REFERENCE TO RELATED APPLICATIONS

This application claims the benefit of PCT Application No. PCT/IB2013/002851, filed on Dec. 21, 2013, which claims the benefit of PCT Application No. PCT/IB2013/001693, filed on Aug. 1, 2013, which is hereby incorporated by reference for all purposes as if fully set forth herein.

BACKGROUND OF THE INVENTION

Field of the Invention

The first improvement is concerned with wave activated power generation system with the rack & pinion mechanism, in which concrete structures of power generation buoy and power generation unit is shown.

Description of the Prior Art

U.S. patent application Ser. No. 13/413,839 shows the usage of wave power energy for generating electric energy. It is wonderful as in theory. However, when the device is actually made, it has some faults.

Problems that Invention is Solving

The first fault of U.S. patent application Ser. No. 13/413,839 is as follows:
(A) It is undesirable that a rack & pinion system is exposed directly to seawater.
(B) Certainly, the power generation buoy manufactured from fiber-reinforced plastic material is excellent in a causticity and structural strength. However, the rack & pinion system is installed outside surface of the power generation buoy because the inside of the power generation buoy has been buried by the FRP structure in U.S. patent application Ser. No. 13/413,839. In this case, the rack & pinion system will be exposed directly to seawater.
(C) The power generation buoy need not be manufactured from fiber-reinforced plastic material necessarily.

The second fault of U.S. patent application Ser. No. 13/413,839 is as follows:
(A) The power generation buoy is restricted with a guide roller and slide frame. The guide roller is attached to the shroud assembly of power generation unit and the slide frame is installed to the power generation buoy.
(B) This structure is excellent in the point that the worker is not to come in contact with power generation buoy. However, the adjustment of space between the guide roller and the slide frame is difficult, because the power generation buoy is shaken to the right and left by waves of the sea. And, it is enough to prevent the worker from coming in contact with the power generation buoy by placing the fence.

The third fault of U.S. patent application Ser. No. 13/413,839 is as follows:
(A) The most difficult problem in the rack & pinion method is to keep constant the distance between the rack gear and the pinion gear.
(B) The rack gear is attached to the power generation buoy, and the pinion gear is installed to the power generation unit. The power generation buoy and the power generation unit are independent. The power generation buoy freely moves up and down inside of the power generation unit and is always shaken to the right and left by waves of the sea.
(C) The condition of guide roller and slide frame is only contact. They are not fixed. Therefore, the position of rack gear and pinion gear always vibrates.
(D) The combination of the rack gear and the pinion gear cannot meet each other, if some device is not done.

The fourth fault of U.S. patent application Ser. No. 13/413,839 is as follows:
(A) The mechanical stopper for the power generation buoy is not shown in it.
(B) The wave height of the ocean has the possibility to exceed the length of the rack gear. When the wave height exceeds the length of the rack gear, it is necessary to stop the power generation buoy mechanically.

The fifth fault of U.S. patent application Ser. No. 13/413,839 is optional:
(A) In U.S. patent application Ser. No. 13/413,839, the control theory has recovered the potential energy of the power generation buoy by adjusting the load of the generator to zero.
(B) The cutting device is necessary to adjust the load to zero instantaneously. It is thought that the electromagnetic clutch is necessary.

SUMMARY OF THE INVENTION

For improving these problems, the processing technology and concept are described. It is undesirable that rack & pinion system is exposed directly to seawater.
(A) When the rack & pinion system can be placed inside of the power generation buoy, the gear system will not be exposed to seawater. To put the gear system in the power generation buoy, the power generation buoy should have vacant space in the power generation buoy.
(B) A vacant power generation buoy is inferior in structural strength. It is necessary to reinforce the power generation buoy structurally. It is preferable that the power generation buoy is composed of the surface material of stainless steel and the frame of the steel material. Of course, FRP is acceptable.

It is difficult to adjust the distance between the guide roller and the slide frame, because the power generation buoy is shaken to the right and left by waves of the sea.
(A) The power generation buoy is restricted with guide roller and slide frame.
(B) It is necessary to control the engagement distance of the rack gear and the pinion gear in millimeter units. However, it is impossible to control the movement of the power generation buoy in millimeter units.
(C) When we give up the impossible control, the structure becomes simple. The movement of the power generation buoy cannot be controlled in precision. The structure becomes simple when the guide roller is attached on the surface of power generation buoy.
(D) The power generation buoy is enclosed with the fence for the worker's safety.

The most difficult problem in the rack & pinion method is to keep constant the distance between the rack gear and the pinion gear
(A) It is necessary to control the engagement distance of the rack gear and the pinion gear in millimeter units. Otherwise, the rack gear and pinion gear will come off. However, it is impossible to control the movement of the power generation buoy in millimeter units. So, it is impossible to control the movement of the rack gear in millimeter units because the rack gear is attached to the power generation buoy.

(B) When the pinion gear is fixed, it is inevitable that the rack gear and the pinion gear come off. Therefore, the pinion gear should vary its position according to the movement of the rack gear. However, the pinion gear is not floating in the air. The pinion gear must be fixed to the power generation unit. Otherwise, it falls down.

(C) Fortunately, because the movement of the power generation buoy is restrained with the guide roller and the slide frame, the vibration of the rack gear is not large. Therefore, the blurring of the center axis of pinion gear is not large either.

(D) If the pinion gear is fixed in a loose fit type arrangement, the vibration of the axis center of the pinion gear will be controllable. However, the rotation axis connected with the Generator must be supported firmly.

(E) We connected the pinion gear axis to the axis of Generator with a universal joint. This method is effective.

The mechanical stopper for the power generation buoy is as follows:

(A) The wave height of the ocean has the possibility to exceed the length of the rack gear. When the wave height exceeds the length of the rack gear, it is necessary to stop the power generation buoy. There are several methods for stopping the power generation buoy. Mechanical stopper is most reliable.

(B) The power generation buoy moves up and down inside of the space surrounded by the slide frames of the power generation unit. The movement of the power generation buoy is limited in this space. Therefore, the lower end stopper of power generation buoy is placed at the bottom of the slide frame so that the power generation buoy should not fall down anymore. It is necessary to note the assembly procedure because the power generation buoy does not enter when the lower end stopper is previously built in.

(C) The upper end stopper is clever a little more. The inside of the power generation buoy in this invention is vacant. It is effective to stop the power generation buoy using the inside bottom surface of power generation buoy.

(D) The pinion system is placed to the frame of the power generation unit. The frame of the power generation unit has come into the power generation buoy because the pinion system is inside of the power generation buoy. The bottom surface of the power generation buoy rises when the power generation buoy rises because of the wave. The position of the frame of the power generation unit to which the pinion system has attached is fixed. The rise of the power generation buoy is stopped with the frame of the power generation unit.

(E) The position of upper end stopper and lower end stopper is decided by the length of rack gear and the position of pinion gear.

In U.S. patent application Ser. No. 13/413,839, the control theory has recovered the potential energy of the power generation buoy by adjusting the load of the Generator to zero.

(A) The cutting device is necessary to adjust the load to zero instantaneously. It is thought that the electromagnetic clutch is necessary.

(B) The output of the Generator is a load of the power generation buoy. The alternating-current generator can adjust the output of the Generator to zero by adjusting the field current to zero. However, it is uncertain whether to be able to adjust the load of the Generator to zero only by controlling the field current.

(C) When the electromagnetic clutch is put upstream of the Generator, the load of the Generator mechanically becomes zero.

Figure 1:
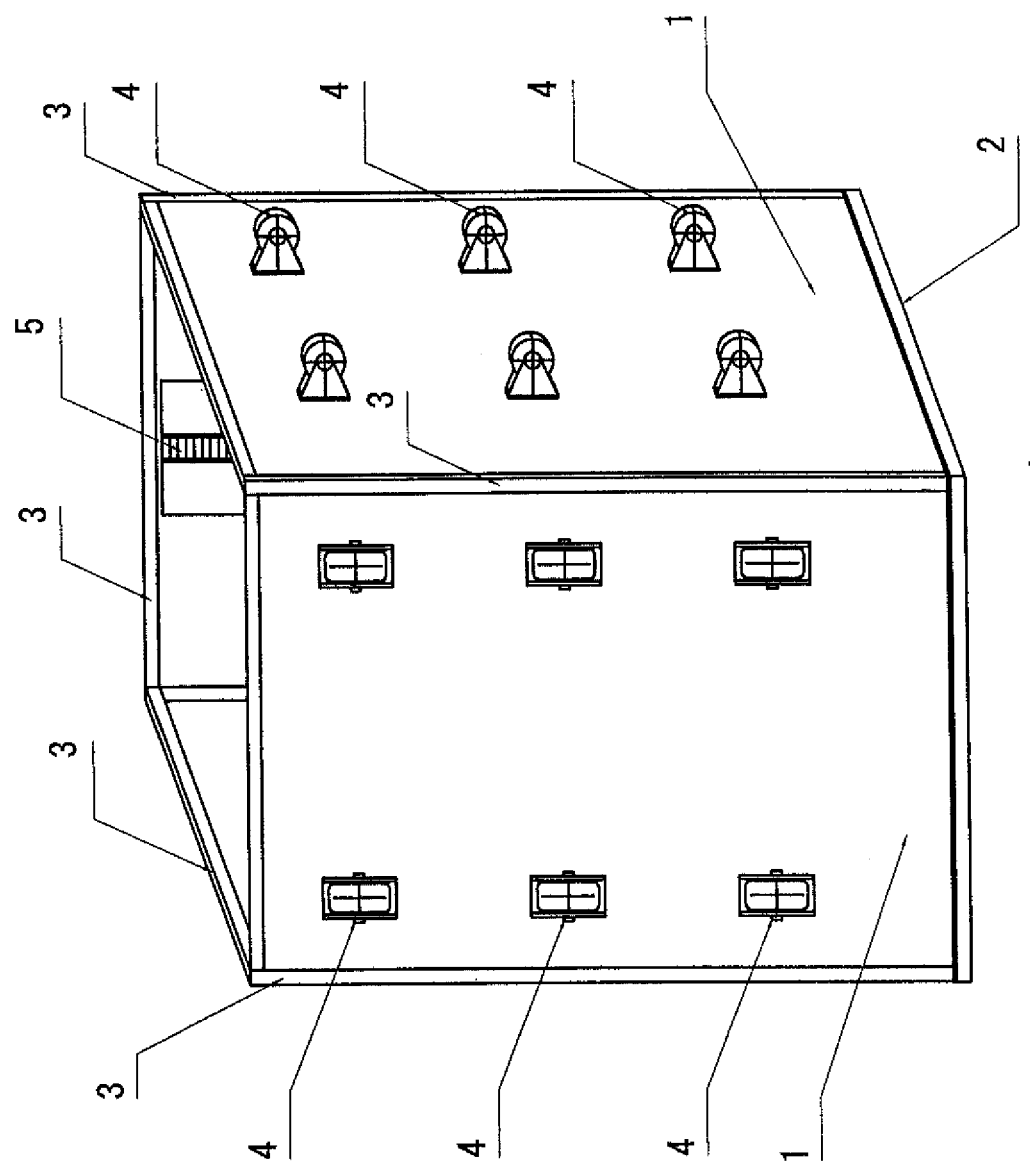
FIG. 1 shows a power generation buoy assembly using the references of (1) Side surface, (2) Bottom surface, (3) Buoy frame, (4) Guide roller, and (5) Rack gear.

(78) Generator, (79) Power generation device support board, (80) Pinion system support frame, and Guide roller (81).

DESCRIPTION OF THE PREFERRED EMBODIMENT

Referring to the drawing as follows, it explains the form of the concrete execution of the manufacturing process for the power generation unit and explains an improved wave activated power generation system by a rack & pinion mechanism.

FIG. 1 shows a power generation buoy assembly. The Side surface (1) and Bottom surface (2) form the power generation buoy. Rack gear (5) is installed on the inside surface of the power generation buoy, and several Guide rollers (4) are attached on the outside surface of the buoy. The power generation buoy has vacant space inside it. The power generation buoy is reinforced with the Buoy frame (3).

Figure 2:
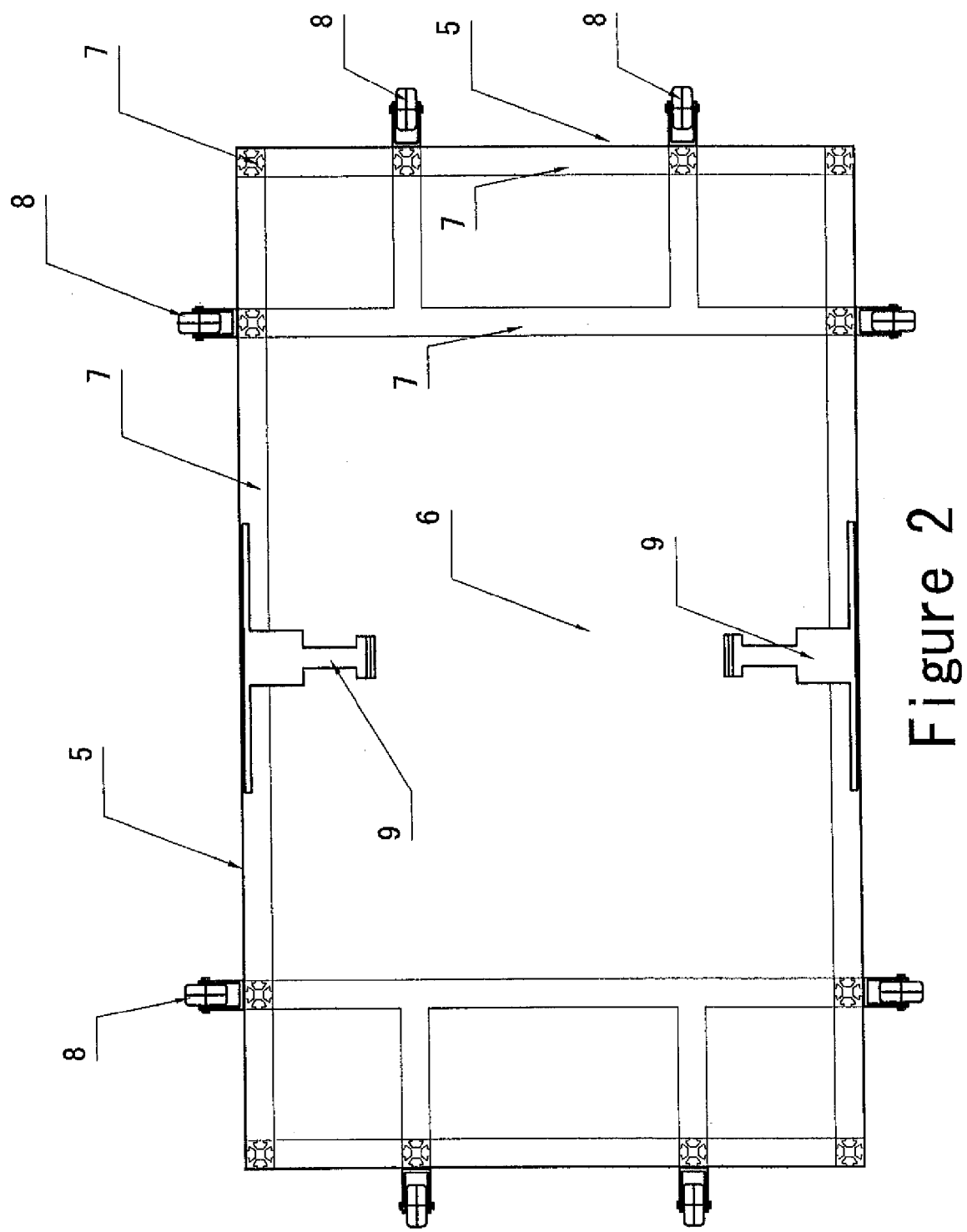
FIG. 2 shows a figure where power generation buoy assembly is seen right above using the references of (5) Side surface, (6) Bottom surface, (7) Buoy frame, (8) Guide roller, and (9) Rack gear.

FIG. 2 shows a figure where power generation buoy assembly is seen right above. The Side surface (5) and Bottom surface (6) form the power generation buoy. A pair of Rack gear (9) are installed on the inside surface of the power generation buoy, and several Guide rollers (8) are attached on the outside surface of the buoy. Each Guide roller shown FIG. 2 has the row of Guide roller from the buoy top to the buoy bottom. The power generation buoy has vacant space inside it. The power generation buoy is reinforced with the Buoy frame (7).

Four corner type and circle type are acceptable for the shape of the power generation buoy. The most important element of the power generation buoy is watertight and structural strength. To satisfy them, a light material is filled to the entire power generation buoy. However, when the power generation buoy is filled with a light material, the rack and pinion gear is placed outside of the buoy. The outside of the buoy is seawater, so the rack gear and pinion gear are exposed directly to seawater. When the rack & pinion is exposed to seawater, the entire power generation system will be exposed to seawater. Durability of power generation system becomes a problem.

It is undesirable that rack & pinion system is exposed directly to seawater.
- (A) When the rack & pinion gear system is placed inside the power generation buoy, the system is not exposed to seawater. To place the gear system in the power generation buoy, the power generation buoy should have vacant space in it.
- (B) A vacant power generation buoy is inferior to structural strength. It is necessary to reinforce the power generation buoy structurally. It is preferable that the power generation buoy is composed of the surface material of stainless steel and the frame of the steel material. Of course, FRP is acceptable.

Figure 3:
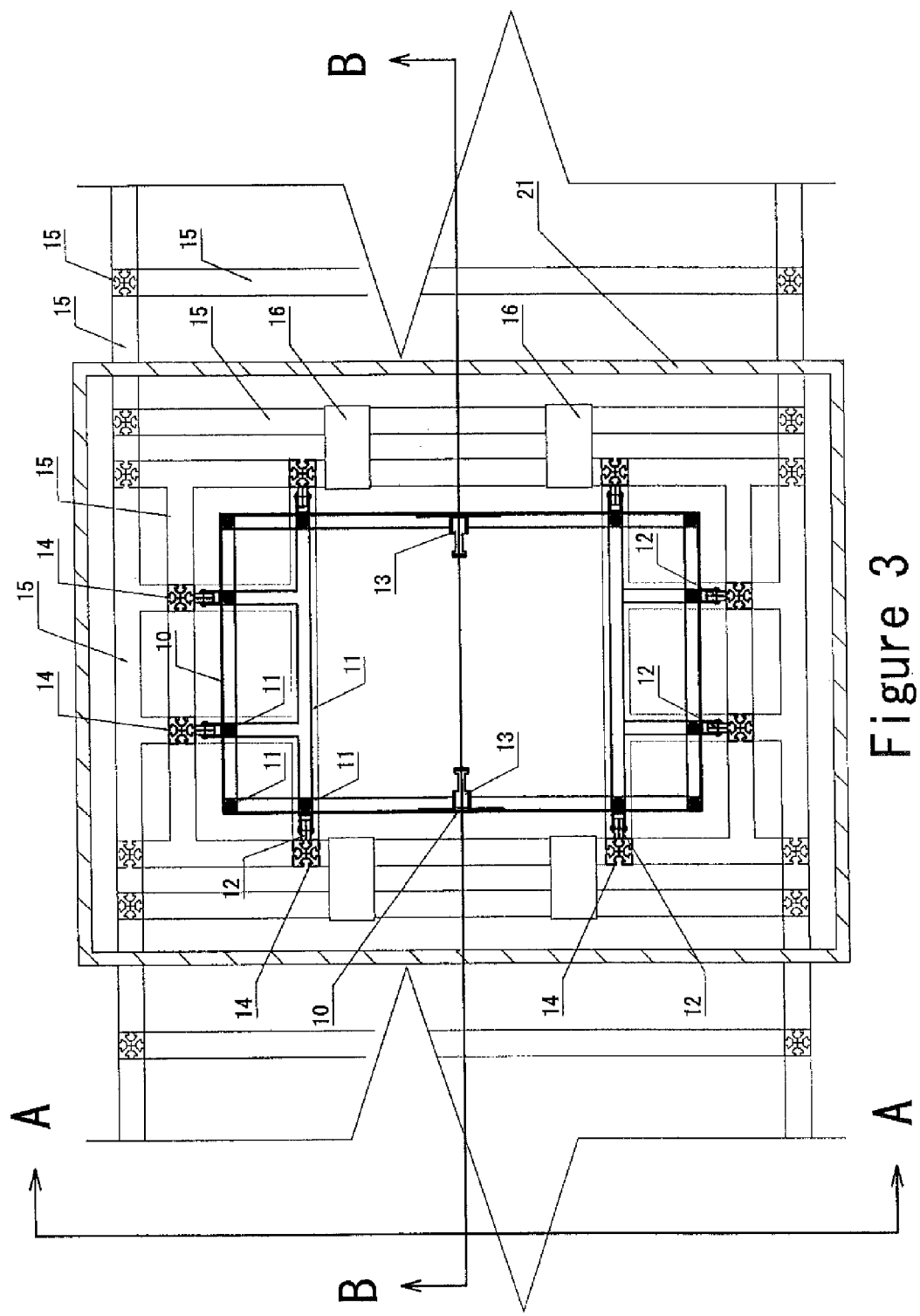
FIG. 3 shows a figure where the power generation buoy assembly and power generation unit are seen right above using the references of (10) Side surface, (11) Buoy frame, (12) Guide roller, (13) Rack gear, (14) Slide frame, (15) Unit frame, (16) Reinforcement plate, and Fence (21).

FIG. 3 shows a figure that power generation buoy assembly and power generation unit is seen right above. Side surface (10) of power generation buoy is reinforced by Buoy frame (11). A pair of Rack gear (13) is installed inside the power generation buoy. Two or more Guide rollers (12) are installed on all Side surfaces (10) of the outside of the power generation buoy assembly. Each Guide roller shown in FIG. 3 has a row of Guide rollers from the buoy top to the buoy bottom. The Guide roller (12) comes in contact with Slide frame (14). The number of the Slide frames (14) corresponds to the number of Guide roller rows (13). The Slide frames (14) are installed in the power generation unit. Slide frames (14) are structure frames of the power generation unit. Power generation unit is made of many Unit frames (15). Unit frames (15) are reinforced by Reinforcement plate (16). The power generation unit is surrounded by Fence (21).

The vacant power generation buoy assembly does not have rigidity. Therefore, the wall vibrates by the power of the wave. It is necessary to reinforce the side surface of power generation buoy by the frames. As the compensation, the rack and pinion gear can be installed inside the power generation buoy.

By the FIG. 3, it is understood how the power generation buoy moves in the power generation unit. Basically, the power generation unit and the power generation buoy assembly are independent. They only come in contact with the guide rollers and the slide frames.

Figure 4:
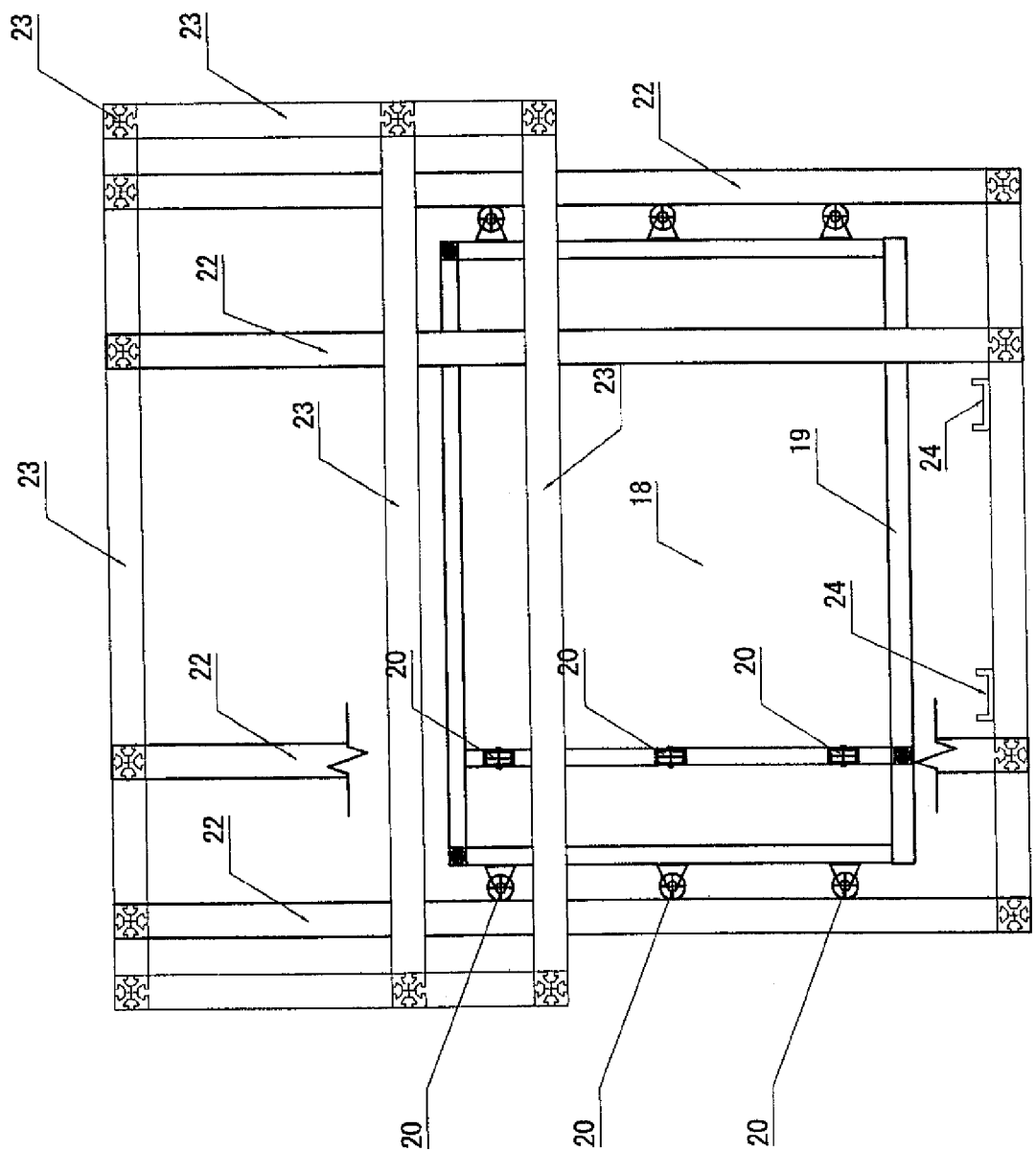
FIG. 4 shows a figure where the power generation buoy assembly and power generation unit are seen from arrow view of A-A in FIG. 3 using the references of (18) Side surface, (19) Bottom surface, (20) Guide roller, (22) Slide frame, (23) Unit frame, and (24) Lower end stopper.

FIG. 4 shows a figure where the power generation buoy assembly and power generation unit are seen from arrow view of A-A in FIG. 3. Side surface (18) and Bottom surface (19) form the power generation buoy to be watertight. Two or more Guide rollers (20) are installed on all Side surfaces (18) of the outside of the power generation buoy assembly. Every row of Guide rollers (20) is placed from the buoy top to the buoy bottom. The Guide roller (20) come in contact with Slide frame (22). The Slide frames (22) are installed in the power generation unit. Slide frames (22) are structure frames of the power generation unit. Power generation unit is made of many Unit frames (23). Two or more Lower end stopper (24) are attached on the bottom frame of the power generation unit.

By the FIG. 4, it is understood how the power generation buoy moves in the power generation unit. Basically, the power generation unit and the power generation buoy assembly are independent. Power generation buoy assembly moves up and down in the power generation unit. They only come in contact with the guide roller and slide frames. Every movement is restricted with the guide roller and the slide frame, excluding the vertical movement.

The movement of the power generation buoy is mechanically stopped by the lower end stoppers. The power generation buoy does not drop off from the power generation unit.

Figure 5:
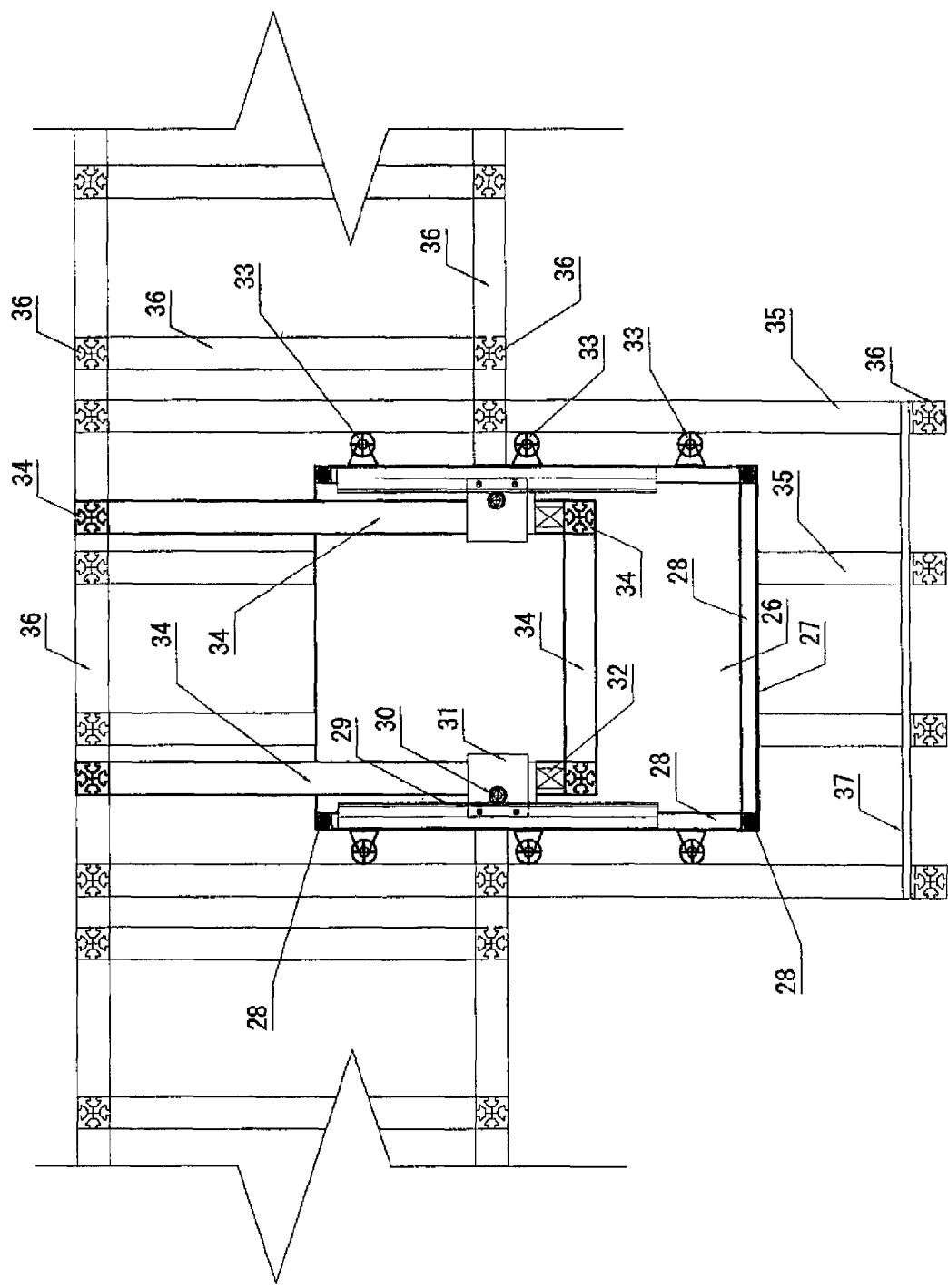
FIG. 5 shows a figure where the power generation buoy assembly and power generation unit are seen from arrow view of B-B in FIG. 3 using the references of (26) Side surface, (27) Bottom surface, (28) Buoy frame, (29) Rack gear, (30) Pinion gear, (31) Gear box, (32) Damper, (33) Guide roller, (34) Pinion system support frame, (35) Slide frame, (36) Unit frame, and (37) Lower end stopper.

FIG. 5 shows a figure where the power generation buoy assembly and power generation unit are seen from arrow view of B-B in FIG. 3. Side surface (26) and Bottom surface (27) form power generation buoy with watertight. The power generation buoy is reinforced by Buoy frame (28). Rack gear (29) is installed on the surface of the inside of the power generation buoy. The Rack gear (29) is installed on the two side surfaces of power generation buoy. Pinion gear (30) and Gear box (31) and Damper (32) are attached to Pinion system support frame (34). The Pinion system support frame (34) is connected to Unit frame (36). The Pinion gear (30) and the Gear box (31) and the Damper (32) are placed on the two side of power generation buoy, corresponding to the Rack gear (29). Two or more Guide rollers (33) are installed on all Side surfaces (26) of the outside of the power generation buoy assembly. Every row of Guide rollers (33) is placed from the buoy top to the buoy bottom. Guide rollers (33) comes in contact with Slide frames (35). The Slide frames (35) are installed in the power generation unit. Power generation unit is made of many Unit frames (36). Lower end stopper (37) is attached on the bottom frame of the power generation unit.

By the FIG. 5, it is understood how the rack and pinion gear system is placed in the power generation buoy. When a big vacant space is produced inside of the power generation buoy, the rack & pinion system can be put in the power generation buoy. Structural strength of the power generation buoy weakens as the compensation. The power generation buoy without strength always vibrates by the sea wave. Basically, the power generation unit and the power generation buoy assembly are independent. They come in contact with the Guide rollers and the slide frames. The rack gear and the pinion gear mutually have a suitable combination position. It is difficult to keep the position of the rack gear and the pinion gear to be constant, when they are independent.

It is difficult to keep constant the distance between the Guide rollers and the slide frames, because the power generation buoy is shaken to the right and left by waves of the sea.

(A) The power generation buoy is restricted with the guide rollers and slide frames.

(B) The rack gear and the pinion gear mutually have a suitable combination position. It is necessary to control the engagement distance of the rack gear and the pinion gear in millimeter units. However, it is impossible to control the movement of the power generation buoy in millimeter units.

(C) When we give up the impossible control, the structure becomes simple. The movement of the power generation buoy cannot be controlled in precision.

(D) The structure becomes simple when the guide rollers are attached on the surface of the power generation buoy.

(E) The power generation buoy is enclosed with the fence for worker safety.

Figure 6:
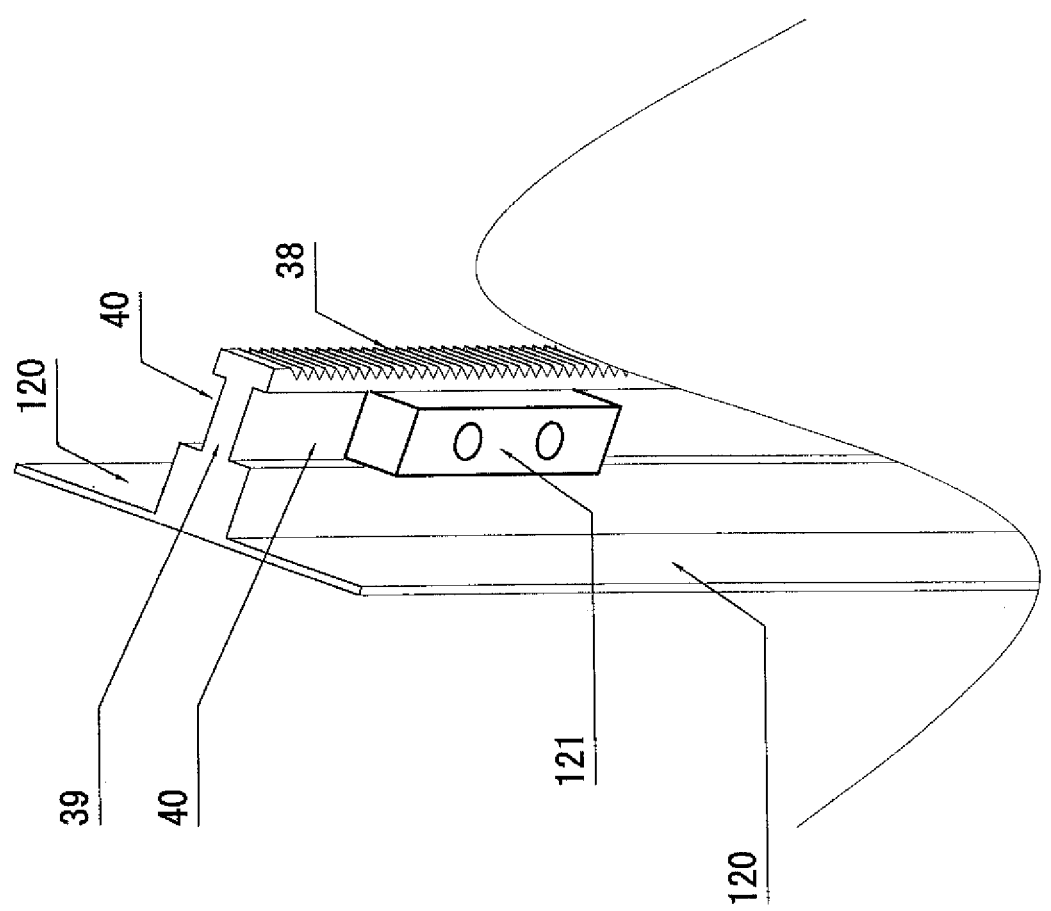
FIG. 6 shows a shape of a rack gear using the references of (38) Rack teeth, (39) Rack web, (40) Rack ditch, (120) Rack flange, and (121) Slide bearing.

FIG. 6 shows a shape of a rack gear. The rack gear has a special shape because the shape of the rack gear is key for making sure that the engagement of the rack gear and the pinion gear is kept constant. The rack gear is composed of Rack teeth (38), Rack web (39), Rack ditch (40), and Rack flange (120). The Rack teeth (38) is the teeth of a gear. The Rack web (39) is the web of a gear. The Rack flange (120) is the support flange of a gear. The Rack ditch (40) is a ditch where Slide bearing (121) does the sliding. The Slide bearing (121) is made from the metal that contains oil.

The Slide bearing (121) moves up and down in the Rack ditch (40). When the rack gear assembly vibrates to the right or left, the Slide bearing (121) follows the movement of the rack gear assembly.

Figure 7:
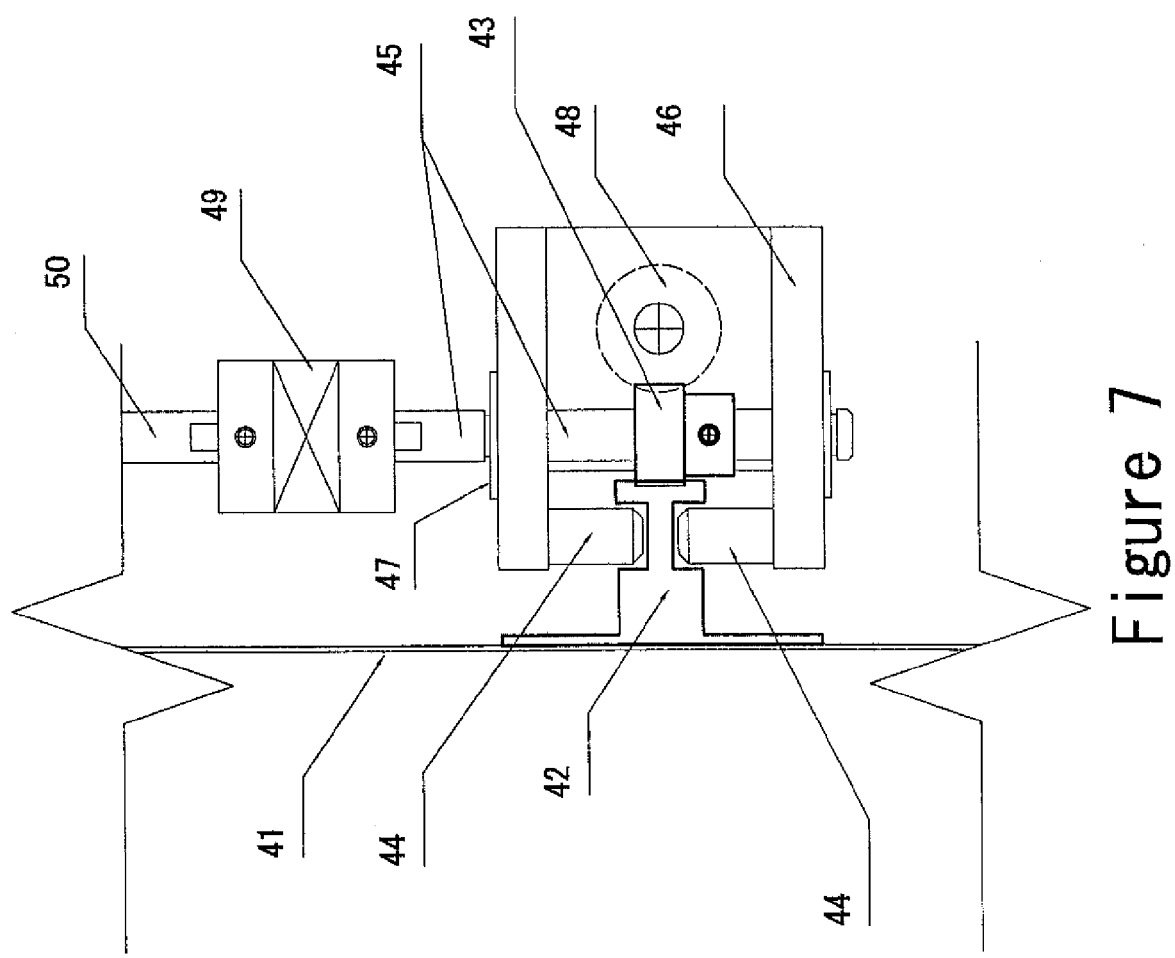
FIG. 7 shows a figure where the rack & pinion system is seen right above using the references of (41) Side surface, (42) Rack gear, (43) Pinion gear, (44) Slide bearing, (45) Pinion axis, (46) Gear box, (47) Axis bearing, (48) Damper, (49) Universal joint, and (50) Generator axis.

FIG. 7 shows a figure where rack & pinion system is seen right above. Rack gear (42) is fixed to Side surface (41) of the power generation buoy. Ditch has been cut in the web of the Rack gear (42). A pair of Slide bearing (44) is placed with narrow clearance in the ditch. The pair of Slide bearing (44) pinches the web of the rack gear. The pair of Slide bearing (44) is fixed to Gearbox (46) by bolts. The bolts are not shown in FIG. 7. Pinion gear (43), Pinion axis (45), and Axis bearing (47) are placed in the Gearbox (46). The Pinion gear (43) rotates in the Gearbox (46). The Pinion axis (45) is connected with Generator axis (50) through Universal joint (49). The Gearbox (46) is attached to Damper (48). The Damper (48) is fixed to pinion system support frame. The pinion system support frame is not shown in FIG. 7.

The Pinion gear (43) and the Rack gear (42) come in contact by their combination. The Pinion gear (43) is supported with the Gearbox (46) and rotates in the Gearbox (46). The Slide bearing (44) is fixed to the Gearbox (46) with bolts. A pair of Slide bearing (44) pinches the Rack gear (42) with narrow clearance. Therefore, the position of the Rack gear (42) and the Pinion gear (43) is kept constant. The vibration of the Rack gear (42) is transmitted to the Pinion gear (43). However, the vibration of the Pinion axis (45) is not transmitted to the Generator axis (50), because the Pinion axis (45) and the Generator axis (50) are united by the Universal joint (49).

Figure 8:
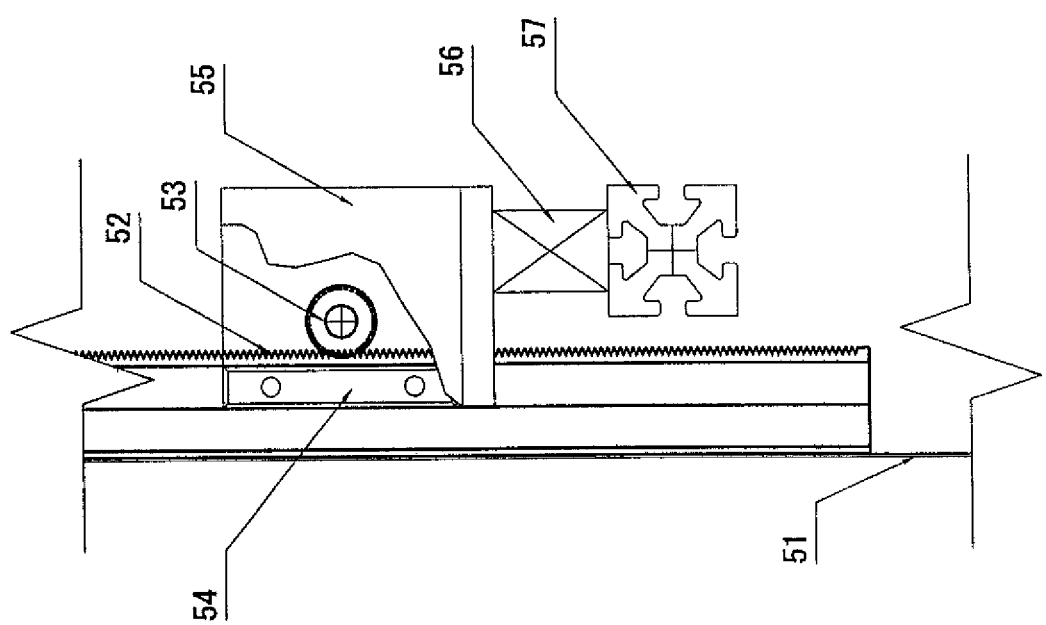
FIG. 8 shows a figure where the rack & pinion system is seen in front chart using the references of (51) Side surface, (52) Rack gear, (53) Pinion gear, (54) Slide bearing, (55) Gear box, (56) Damper, and (57) Pinion system support frame.

FIG. 8 shows a figure where rack & pinion system is seen in front chart. Rack gear (52) is fixed to Side surface (51) of the power generation buoy. Ditch has been cut in the web of the Rack gear (51). Slide bearing (54) is placed with narrow clearance in the ditch. The Slide bearing (54) is fixed to Gearbox (55). Pinion gear (53) is installed to the Gearbox (55) and rotates in the Gearbox (55). The Gearbox (55) is attached to Damper (56). The Damper (56) is fixed to Pinion system support frame (57).

The Pinion gear (53) and the Rack gear (52) come in contact by combination. The Pinion gear (53) is supported with the Gearbox (55) and rotates in the Gearbox (55). The Slide bearing (54) is fixed to the Gearbox (55). Slide bearing (54) is placed in the Rack gear (52) with narrow clearance. The Slide bearing (54) moves up and down in the ditch of the Rack gear (52). Oppositely when the position of slide bearing is fixed, the rack gear moves up and down.

The Slide bearing (54) is fixed to the Gearbox (55). Pinion gear (53) is supported with the Gearbox (55). The position of the Rack gear (52) and the Pinion gear (54) is kept constant. However, when the Rack gear (52) vibrates to right and left, the Gearbox (55) also vibrates. If the Gearbox (55) is firmly installed in the Pinion system support frame (57), the Gearbox (55) will be broken. To avoid it, the Gearbox (55) is fixed to the Pinion system support frame (57) by the Damper (56). However, the Gearbox (55) fixed by the Damper (56) vibrates slightly. When the Gearbox (55) vibrates, pinion axis vibrates, too. So as not to transmit the vibration of pinion axis to generator axis, pinion axis and generator axis are connected by universal joint. Pinion axis, generator axis and universal joint are not shown in FIG. 8.

The most difficult problem in a rack & pinion method is to keep constant the distance between the rack gear and the pinion gear.

(A) It is necessary to control the engagement of the rack gear and the pinion gear by in millimeter units. Otherwise, the rack gear and pinion gear will come off (B) However, it is impossible to control the movement of the power generation buoy in millimeter units. So, it is impossible to control the movement of the rack gear in millimeter units because the rack gear is attached to the power generation buoy.

(C) If the pinion gear is fixed, it is inevitable that the rack gear and the pinion gear come off. Therefore, the pinion gear should vary its position according to the movement of the rack gear.

(D) However, the pinion gear is not floating in the air. The pinion gear must be fixed to the power generation unit. Otherwise, it falls down.

(E) Fortunately, because the movement of the power generation buoy is restrained with the Guide roller and the slide frame, the vibration of the rack gear is not large. Therefore, the movement of the center axis of the pinion gear is not large either.

(F) If the pinion gear is fixed to be a loose fit type, the vibration of the axis center of the pinion gear will be controllable. However, the rotation axis connected with the generator must be supported firmly.

(G) The pinion gear axis is connected to the generator axis with a universal joint. This method is effective.

Figure 9:
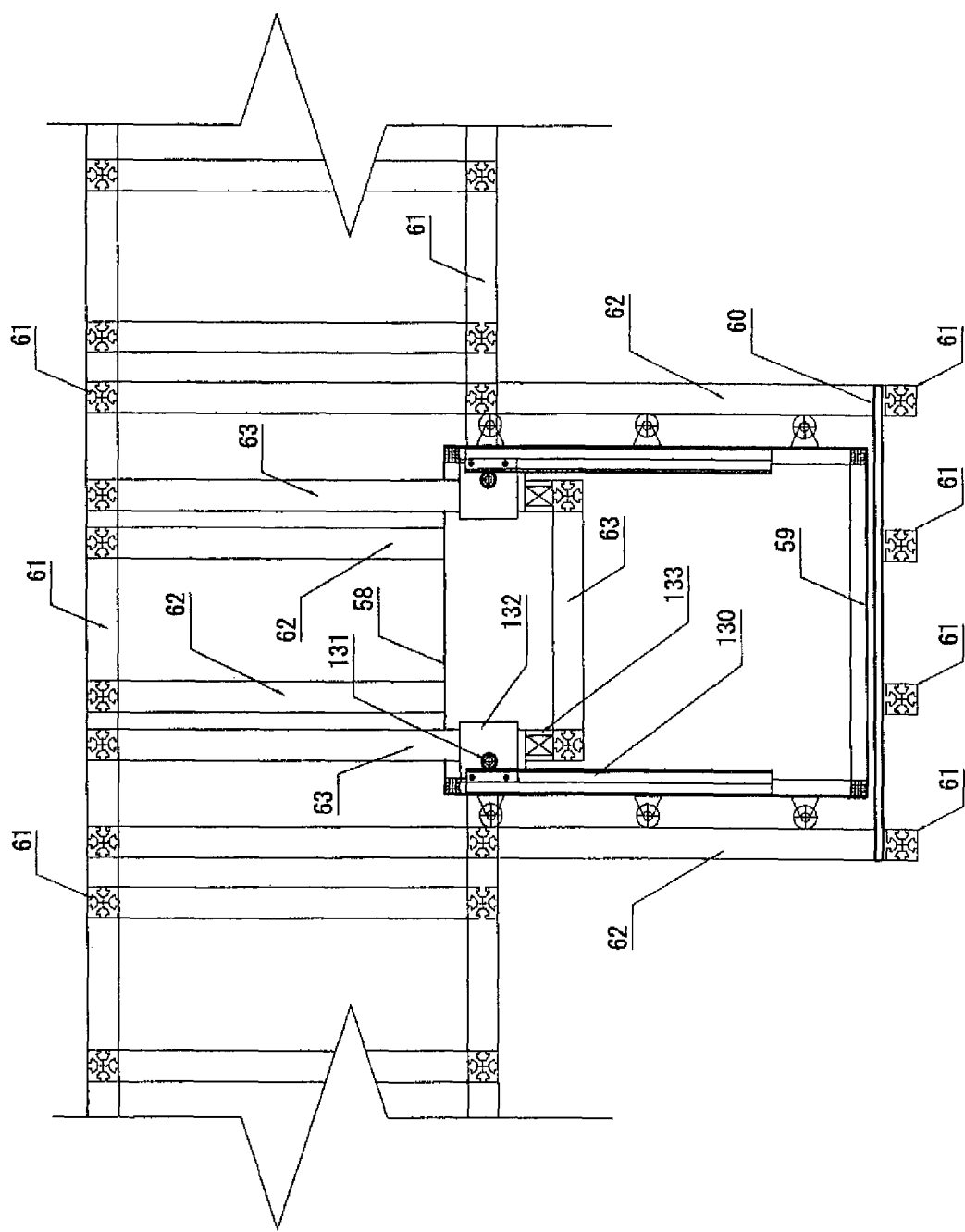
FIG. 9 shows a figure that the power generation buoy assembly stops at the lower end stopper using the references of (58) Power generation buoy assembly, (59) Bottom surface, (60) Lower end stopper, (61) Unit frame, (62) Slide frame, (63) Pinion system support frame, (130) Rack gear, (131) Pinion gear, (132) Gearbox, and (133) Damper.

FIG. 9 shows a figure that the power generation buoy assembly stops at the lower end stopper. Power generation buoy assembly (58) moves up and down in the power generation unit along Slide frame (62). Bottom surface (59)

is the bottom of the Power generation buoy assembly (58). The power generation unit is manufactured from a lot of Unit frames (61). Lower end stopper (60) is attached at the bottom frame of the power generation unit. Pinion system support frame (63) is inside the Power generation buoy assembly (58). The Pinion support frame (63) is connected to the Unit frame (61) that composes the power generation unit. The Rack gear (130) is installed on the two side surfaces of Power generation buoy assembly (58). Pinion gear (131) and Gearbox (132) and Damper (133) are attached to Pinion system support frame (63). The Pinion system support frame (63) is connected to Unit frame (61).

When the Power generation buoy assembly (58) descends in the power generation unit, the Bottom surface (59) of the Power generation buoy assembly (58) approaches the Lower end stopper (60). The Power generation buoy assembly (58) is stopped mechanically when the Bottom surface (59) comes in contact with the Lower end stopper (60). It is necessary to note the assembly procedure because the power generation buoy does not enter when the lower end stopper is previously built in.

The position of the Lower end stopper (60) is related to the length of the Rack gear (130) and the position of the Pinion gear (131). The length of the Rack gear (130) is related to the size of the wave of the sea.

Figure 10:
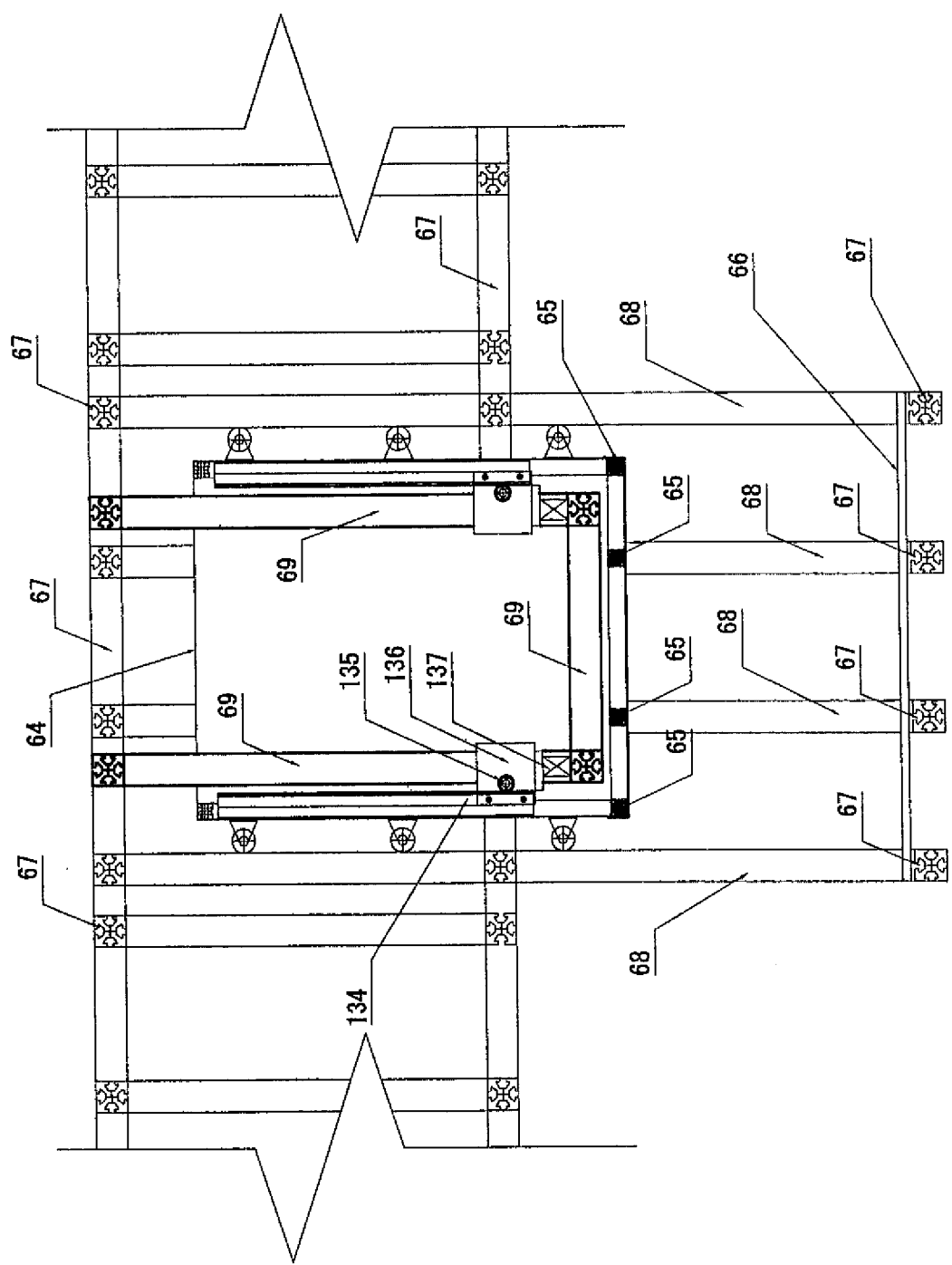
FIG. 10 shows a figure that the power generation buoy assembly stops at the upper end stopper (Pinion support frame) using the references of (64) Power generation buoy assembly, (65) Buoy frame, (66) Lower end stopper, (67) Unit frame, (68) Slide frame, (69) Pinion system support frame, (134) Rack gear, (135) Pinion gear, (136) Gearbox, and (137) Damper.

FIG. 10 shows a figure that the power generation buoy assembly stops at the upper end stopper. Power generation buoy assembly (64) moves up and down in the power generation unit along Slide frame (68). Buoy frame (65) is a reinforcement frame of the Power generation buoy assembly (64). The power generation unit is manufactured from a lot of Unit frames (67). Lower end stopper (66) is attached at the bottom frame of the power generation unit. Pinion system support frame (69) is inside the Power generation buoy assembly (64). The Pinion system support frame (69) is connected to the Unit frame (67) that composes the power generation unit. The Pinion system support frame (69) is the upper end stop, concurrently. The Rack gear (134) is installed on the two side surfaces of Power generation buoy assembly (64). Pinion gear (135) and Gearbox (136) and Damper (137) are attached to Pinion system support frame (69). The Pinion system support frame (69) is connected to Unit frame (67).

When the Power generation buoy assembly (64) rises in the power generation unit, the lower Buoy frame (65) of the Power generation buoy assembly (64) approaches the Pinion system support frame (69) connected to the Unit frame (67). The Power generation buoy assembly (64) is stopped mechanically when the lower Buoy frame (65) comes in contact with the Pinion system support frame (69). The Pinion system support frame (69) is the upper end stop, concurrently.

The position of the bottom frame of Pinion system support frame (69) is related to the length of the Rack gear (134) and the position of the Pinion gear (135). The length of the Rack gear (134) is related to the size of the wave of the sea.

The mechanical stopper for the power generation buoy is as follows:
(A) The wave height of the ocean has the possibility to exceed the length of the rack gear. When the wave height exceeds the length of the rack gear, it is necessary to stop the power generation buoy. There are several methods for stopping the power generation buoy. Mechanical stoppers are most reliable.
(B) The power generation buoy moves up and down inside of the space surrounded by the slide frames of the power generation unit. The movement of the power generation buoy is limited in this space.
(C) Therefore, the lower end stopper of power generation buoy is placed at the bottom of the slide frame so that the power generation buoy should not fall down anymore. However, it is necessary to note the assembly procedure because the power generation buoy does not enter when the lower end stopper is previously built in.
(D) The upper end stopper is clever a little more. The inside of the power generation buoy in this invention is vacant. It is effective to stop the power generation buoy using the inside bottom surface of power generation buoy.
(E) The pinion system is connected to the frame of the power generation unit. The frame of the power generation unit has expanded into the power generation buoy because the pinion system is inside the power generation buoy.
(F) The bottom surface of the power generation buoy rises when the power generation buoy rises because of the wave. The position of the pinion gear is fixed. The rise of the power generation buoy is stopped by the pinion system support frame connected to the power generation unit.
(G) The position of the upper end stopper and the lower end stopper are decided by the length of the rack gear and the position of pinion gear. The length of the Rack gear and the position of pinion gear are related to the size of the wave of the sea.

Figure 11:
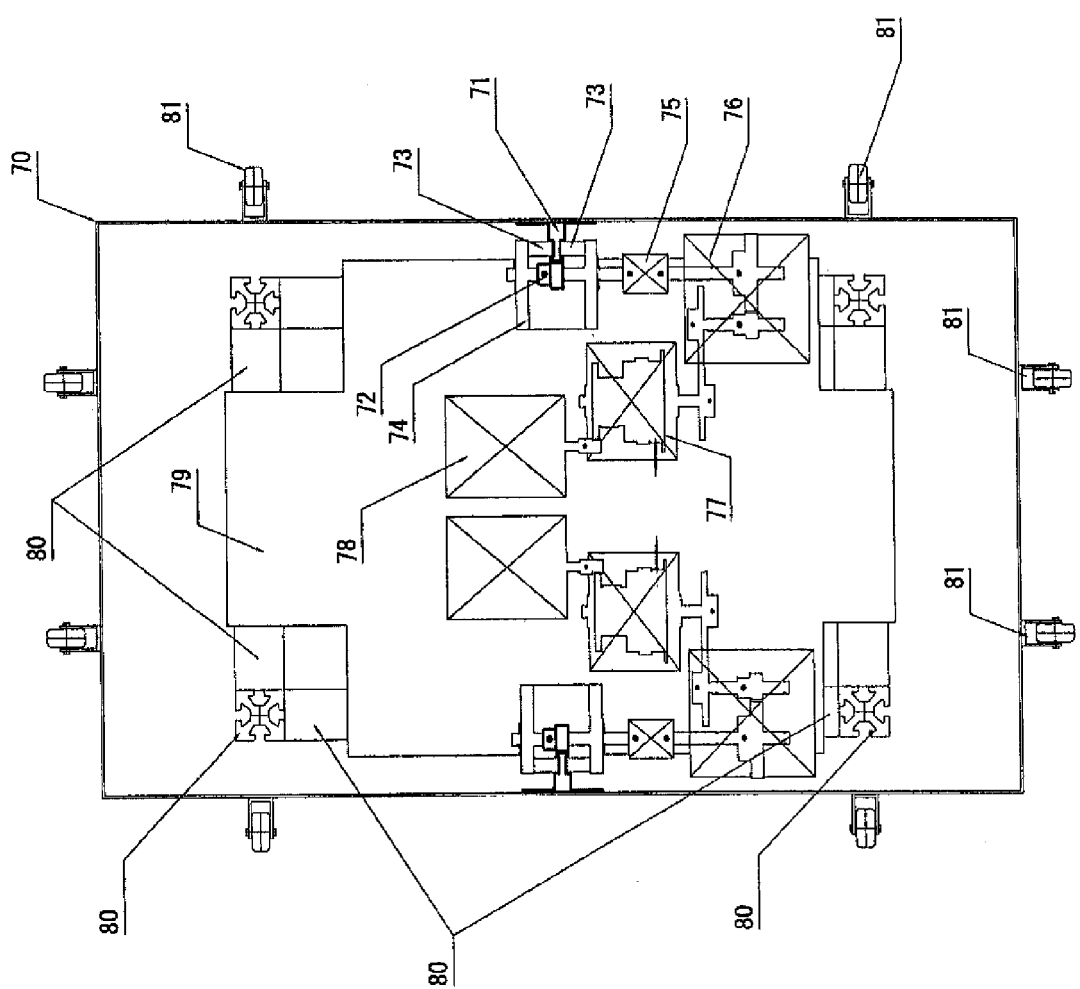
FIG. 11 shows a figure of the power generation system placed in the power generation buoy using the references of (70) Power generation buoy assembly, (71) Rack gear, (72) Pinion gear, (73) Slide bearing, (74) Gearbox, (75) Universal joint (76) Relay gearbox, (77) Electromagnetic clutch.

FIG. 11 shows a figure of the power generation system that is placed in the power generation buoy. Several Guide rollers (81) are installed on all the side surfaces of Power generation buoy assembly (70). Rack gear (71) is installed on the side surface of Power generation buoy assembly (70). Pinion gear (72) and Gearbox (74) are attached to Pinion system support frame (80). Slide bearing (73) is fixed to Gearbox (74). The Pinion system support frame (80) is located inside the Power generation buoy assembly (70). The Output axis of the Gearbox (70) is connected to the input axis of Relay gearbox (76) by Universal joint (75). The Relay gearbox (76) is connected to Electromagnetic clutch (77). The Electro magnetic clutch (77) is connected to Generator (78). The Relay gearbox (76), the Electromagnetic clutch (77) and the Generator (78) are fixed on Power generation device support board (79). The Power generation device support board (79) is fixed to the Pinion system support frame (80).

The Pinion system support frame (80) is fixed to power generation unit frame. The Pinion system support frame (80) is located inside the Power generation buoy assembly (70). Therefore, The Power generation device support board (79) is in the Power generation buoy assembly (70). The power generation unit frame is not shown in FIG. 11. Power generation system is placed inside the power generation buoy. The waterproofing of the power generation system become easy, because seawater does not wet the inside of the power generation buoy. The position of the Relay gearbox (76) and the Electromagnetic clutch (77) can be exchanged if there is installation space.

In U.S. patent application Ser. No. 13/413,839, the control theory has recovered the potential energy of the power generation buoy by adjusting the load of the generator to zero.
(A) The cutting device is necessary to make the load to zero instantaneously. The electromagnetic clutch is suitable.

(B) Output of the generator is the load for the power generation buoy. The alternating-current generator can adjust the output of the generator by adjusting the field current. However, it is uncertain whether to be able to adjust the load of the generator to zero only by controlling the field current.

(C) When the electromagnetic clutch is put on the upstream of the generator, the load of the generator mechanically becomes zero.

It will be appreciated that modifications may be made in the present invention. A structural material is not limited to stainless steel. The power generation buoy with vacant space inside is inferior in structural strength. Naturally, it is necessary to consider FRP. Moreover, glass fiber FRP that is the material is not corroded with seawater. The guide roller can be substituted with the slide bearing plate.

The spirit of this invention is to prevent the power generation system from seawater. It is a big advantage to put the power generation system into the power generation buoy. However, structural strength of the power generation buoy becomes poor, and is also impossible to warrant the combination of the rack gear and the pinion gear. When the shape of rack gear is processed to be a special shape, it is warranted to match rack gear and pinion gear. The pinion gear follows to the change of the rack gear. Accordingly, it should be understood that we intend to cover by the appended claims all modifications falling within the true spirit and scope of our invention.

The invention claimed is:

1. A wave activated power generating device, comprising:
a support frame;
a buoy vertically positioned to rise and fall relative to motion of waves impacting the buoy and the support frame, the buoy being formed with a hollow interior space;
a rack and pinion structure operatively connected between the buoy and the support frame such that a pinion element of the rack and pinion structure generates rotating torque by moving along a rack element in response to the buoy rising and falling by the wave motion;
a power generator unit operatively connected to the rack and pinion structure to generate electricity in response to rotating torque generated by the pinion element, wherein
the rack element is fixedly connected to at least one vertical surface inside the hollow interior space of the buoy,
the pinion element is fixedly mounted on the support frame to extend into the hollow interior space of the buoy and operatively positioned to movably interconnect with the rack element as the buoy rises and falls; and
a plurality of guide rollers fixedly attached to an exterior surface of the buoy and operatively positioned to movably interconnect with the support frame and guide the rising and falling of the buoy.

2. A wave activated power generation device according to claim 1, wherein
the support frame includes a lower mechanical stop structure, and
the buoy includes a bottom surface formed to contact with the lower mechanical stop structure of the support frame during the falling of the buoy so as to mechanically limit downward travel of the buoy.

3. A wave activated power generation device according to claim 1, wherein
the support frame includes an upper mechanical stop structure, and
the buoy includes an upper wall portion formed to contact with the upper mechanical stop structure of the support frame during the rising of the buoy so as to mechanically limit upward travel of the buoy.

4. A wave activated power generation device according to claim 1, wherein
the support frame includes a slide frame operatively positioned to interconnect with the plurality of guide rollers so as to guide the rising and falling of the buoy.

5. A wave activated power generation device according to claim 1, further comprising:
a plurality of slide bearing plates fixedly attached to an exterior surface of the buoy and operatively positioned to movably interconnect with the support frame and guide the rising and falling of the buoy.

6. A wave activated power generation device according to claim 5, wherein
the support frame includes a slide frame operatively positioned to interconnect with the plurality of slide bearing plates so as to guide the rising and falling of the buoy.

* * * * *